United States Patent Office …

3,009,773
CHLORINATION OF NIOBIUM OXYCHLORIDE
Wendell E. Dunn, Jr., Newark, Del., assignor to E. I. du Pont de Nemours and Company, Wilmington, Del., a corporation of Delaware
No Drawing. Filed Mar. 31, 1958, Ser. No. 724,844
1 Claim. (Cl. 23—87)

This invention relates to the chlorination of niobium oxychloride to niobium pentachloride in the presence of carbon as a reducing agent. More specifically, it relates to the use of a catalyst in this chlorination process.

The chlorination of niobium oxychloride to niobium pentachloride with carbon as a reducing agent is a well known reaction, and it is useful in the production of niobium metal. Niobium usually occurs in nature in the form of oxides, and one of the ways for converting the oxides to niobium metal is to chlorinate the niobium oxides to niobium pentachloride, and then reduce the latter to the metal state with a reductant, such as magnesium or sodium.

The chlorination of oxidic niobium ores produces a mixture of niobium pentachloride and niobium oxychloride. Unfortunately, this mixture cannot be directly used in the production of niobium metal since the niobium oxychloride reduces to niobium oxide rather than to metal. One of the most convenient methods of overcoming this problem is to convert the niobium oxychloride to niobium pentachloride by chlorination in the presence of carbon. Although this chlorination of niobium oxychloride to niobium pentachloride is highly efficient, it has been found that small amounts of unreacted niobium oxychloride are present in the materials from the chlorination zone. It is an object of this invention to provide a more efficient chlorination of the niobium oxychloride to niobium pentachloride so that there is a minimum of oxychloride in the products from the chlorination. The objects of this invention are accomplished by maintaining in the chlorination zone a catalytic amount of hydrogen chloride. It has been found that for a particular reaction mixture, a particular grade of carbon, and a particular gas retention time, the additions of small amounts of hydrogen chloride will reduce the amount of niobium oxychloride in the end products. Preferred amounts of hydrogen chloride for this purpose are about 0.1% to about 10% of the total volume of gases fed to the chlorination zone. Amounts below the preferred range are operable, but the effectiveness of the catalyst is lessened as the amount is decreased. Amounts in excess of the preferred range are also operable, but considerations as to cost, efficiency, and subsequent separation make such amounts less desirable. It has also been found that the hydrogen chloride may be formed in situ by using excess chlorine and introducing into the chlorination zone a material which will react with this excess chlorine to form hydrogen chloride. Materials which may form the hydrogen chloride in situ by reaction with chlorine are water, hydrogen, and hydrocarbons such as $CH_4$ or $C_2H_2$. These materials may be introduced into the chlorination zone by mixing them with the reactant gases or by having them adsorbed on the carbon prior to its introduction into the chlorination zone.

For a clearer understanding of the invention, the following specific examples are given. These examples are intended to be merely illustrative of the invention and not in limitation thereof.

*Example I*

A glass reactor tube having an inside diameter of 6.0 cm. and a length of 122 cm. with an inlet at one end and an outlet at the opposite end was used in this example. 100 cc. of −20 +40 mesh activated carbon was placed on a fritted, perforated disc within the tube about 38 cm. from the outlet end, and $Nb_2O_5$ pellets were placed on a porous disc in the tube in a similar manner about 42 cm. from the inlet end of the tube, thus separating the pellets from the carbon. The reactor was heated to a temperature of 525° C., and a feed of $COCl_2$ at 0.022 mol per minute was introduced into the reactor through the inlet, and chlorine at a rate of 0.016 mol/min. was introduced through the same inlet. This quantity of chlorine constitutes a 10% excess over the stoichiometric quantity required for chlorination of $NbOCl_3$ to $NbCl_5$, assuming the complete reaction of $Nb_2O_5$ and phosgene according to the reaction:

$$Nb_2O_5 + 3COCl_2 \rightarrow 2NbOCl_3 + 3CO_2$$

Both gases passed through the heated niobium oxide pellets to produce a gaseous mixture of $NbOCl_3$, $CO_2$ and unreacted chlorine. This gaseous mixture then flowed down the tube and through the bed of activated carbon. The niobium-containing product gases emanating from the activated carbon bed were condensed and collected. Analysis showed that the $NbOCl_3$ content of these condensed gases was 2.4 mol percent, the remainder being essentially niobium pentachloride.

Conditions of the experiment were then changed to the extent that hydrogen chloride gas was introduced into the chlorine gas stream at the rate of 3% of the total gas volume being fed. The niobium-containing product obtained under these conditions contained only 0.4 mol percent $NbOCl_3$, the remainder being essentially $NbCl_5$.

*Example II*

This example illustrates an embodiment of the invention which forms the hydrogen chloride catalyst in situ by introducing water into the incoming chlorine stream. The reactor used was similar to that of Example I. It had an inside diameter of 3 cm. and a length of 61 cm. The carbon bed consisted of 60 cc. of coconut charcoal. The niobium chloride product emanating from the charcoal bed analyzed 80 mol percent $NbOCl_3$. After the addition of water to the incoming chlorine stream by saturating the chlorine with water vapor in a saturator operated at 25° C., the $NbOCl_3$ content of the niobium chloride end product decreased to 15 mol percent, the remainder of the end product being essentially $NbCl_5$.

*Example III*

This example illustrates the formation of the hydrogen chloride catalyst in situ by using carbon which contains adsorbed water. In a reactor consisting of a silica tube 22 mm. inside diameter by 62.5 cm. in length, a 50 cm. bed of "Norit C" activated carbon was packed. The carbon bed was dried at 450° C. under a flow of argon for 4 hours and was then purged with chlorine. Sufficient water remained on the carbon bed to combine with the chlorine to form a catalytic amount of hydrogen chloride. The temperature was raised to 500° C. and a feed of $NbCl_5$ containing 0.5 mol percent $NbOCl_3$ was introduced. The niobium-containing product was condensed and collected. Analysis showed that the $NbOCl_3$ content was less than 0.01 mol percent.

The procedure above was then changed to the extent that substantially all adsorbed water was removed from a similar carbon bed by drying for 24 hours at 550° C. under a flow of argon. The system was then purged with chlorine and the $NbCl_5$ feed containing 0.5 mol percent of $NbOCl_3$ was fed to the reactor. When the bed was thus pre-dried, there was no measurable difference between the amount of $NbOCl_3$ in the end product and the amount in the $NbCl_5$ feed.

In carrying out the process of this invention, storage of the catalyst on the surface of the carbon is considered to take place. This is evidenced by the fact that the NbOcl₃ content in the niobium chloride end product will remain low even after the addition of hydrogen chloride or hydrogen chloride-forming materials is discontinued.

If the hydrogen chloride is formed in situ by using carbon having adsorbed thereon a material which will react with chlorine to form hydrogen chloride, it should be borne in mind that since carbon is one of the reactants, there will be a continuous desorption of the catalyst-forming material from the carbon surface. Thus, the addition of more material to the carbon surface must be repeated periodically. It should also be pointed out that if water is used as a hydrochloride-forming reactant, the amount should be kept small, since an excess amount will result in the hydrolysis of $NbCl_5$ to $NbOCl_3$ and HCl.

As is apparent from the specific examples presented above, this invention significantly reduces the amount of $NbOCl_3$ which is carried over in the end products from the chlorination of the oxychloride. It is also apparent that the invention is convenient, economical, and requires little extra equipment. Therefore, it is ideally suited for increasing yields when chlorinating oxidic niobium ores to niobium pentachloride.

Since it is obvious that many changes and modifications can be made in the above-described details without departing from the nature and spirit of the invention, it is to be understood that the invention is not to be limited to said details except as set forth in the appended claim.

I claim:

In the chlorination of niobium oxychloride to niobium pentachloride with chlorine and carbon as reactants, the improvement which comprises maintaining in the chlorination zone 0.1% to 10% by volume of hydrogen chloride based upon the total gases fed to said chlorination zone.

References Cited in the file of this patent

UNITED STATES PATENTS 2,184,884    Muskat et al. _____ Dec. 26, 1939

OTHER REFERENCES

Spitsyn and Preobrazhenskii, Chemical Abstracts, 35, 2433 (1941) (abstract of article in J. Gen. Chem. (U.S.S.R.), 10, 785–798 (1940).

Sue: Article in Chemical Abstracts, vol. 33, p. 3714 (1939).

Sue: Article in Comptes Rendus, vol. 208 (1939), pages 814–15.

Urazov: Article in Chemical Abstracts, vol. 31, 1937, page 4460.